United States Patent
Ebrahimi et al.

(10) Patent No.: US 10,802,235 B2
(45) Date of Patent: *Oct. 13, 2020

(54) COMMUNICATIONS MODULE HOUSING

(71) Applicant: AFL Telecommunications LLC, Duncan, SC (US)

(72) Inventors: Vahid Ebrahimi, Simpsonville, SC (US); Shirley Ball, Greer, SC (US)

(73) Assignee: AFL Telecommunications LLC, Duncan, SC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/566,164

(22) Filed: Sep. 10, 2019

(65) Prior Publication Data

US 2020/0150369 A1 May 14, 2020

Related U.S. Application Data

(63) Continuation of application No. 16/185,252, filed on Nov. 9, 2018, now Pat. No. 10,451,828.

(51) Int. Cl.
*G02B 6/44* (2006.01)

(52) U.S. Cl.
CPC ................... *G02B 6/4441* (2013.01)

(58) Field of Classification Search
CPC .................................................. G02B 6/4441
See application file for complete search history.

(56) References Cited

U.S. PATENT DOCUMENTS

| | | |
|---|---|---|
| 4,971,421 A | 11/1990 | Ori |
| 5,129,030 A | 7/1992 | Petrunia |
| 5,408,570 A | 4/1995 | Cook et al. |
| D370,891 S | 6/1996 | Keith |
| 5,613,030 A | 3/1997 | Hoffer et al. |
| 5,778,130 A | 7/1998 | Walters et al. |
| 5,825,962 A | 10/1998 | Walters et al. |
| D431,532 S | 10/2000 | Noble et al. |
| 6,175,079 B1 | 1/2001 | Johnston et al. |
| 6,250,816 B1 | 6/2001 | Johnston et al. |
| 6,353,183 B1 | 3/2002 | Ott et al. |
| 6,362,422 B1 | 3/2002 | Vavrik et al. |
| 6,427,936 B1 | 8/2002 | Noel et al. |
| 6,438,308 B1 | 8/2002 | Philips et al. |

(Continued)

FOREIGN PATENT DOCUMENTS

| | | |
|---|---|---|
| AU | 2015203746 A1 | 7/2015 |
| EP | 2279442 A1 | 2/2011 |

(Continued)

*Primary Examiner* — Sung H Pak
(74) *Attorney, Agent, or Firm* — Dority & Manning, P.A.

(57) ABSTRACT

A communications module housing includes an enclosure defining an opening, and a tray movably positioned within the enclosure. The tray includes a base, and a front rail positioned on the base, the front rail including a plurality of first mounts. The tray further includes a platform positioned on the base, the platform including a plurality of second mounts. The tray further includes a rear rail positioned on the base, the rear rail including a plurality of third mounts. The first and second mounts correspond to mounting features of the first communications modules and the third mounts correspond to mounting features of the second communications modules.

15 Claims, 7 Drawing Sheets

(56) References Cited

U.S. PATENT DOCUMENTS

| | | |
|---|---|---|
| 6,711,339 B2 | 3/2004 | Puetz et al. |
| 6,728,461 B1 | 4/2004 | Senatore et al. |
| 6,731,851 B2 | 5/2004 | Sato et al. |
| 6,804,447 B2 | 10/2004 | Smith et al. |
| 6,909,833 B2 | 6/2005 | Henschel et al. |
| 6,920,274 B2 | 7/2005 | Rapp et al. |
| 6,991,471 B2 | 1/2006 | Hayashi et al. |
| 7,031,588 B2 | 4/2006 | Cowley et al. |
| 7,068,907 B2 | 6/2006 | Schray |
| 7,195,521 B2 | 3/2007 | Musolf et al. |
| 7,200,316 B2 | 4/2007 | Giraud et al. |
| 7,346,254 B2 | 3/2008 | Kramer et al. |
| 7,376,321 B2 | 5/2008 | Bolster et al. |
| 7,376,323 B2 | 5/2008 | Zimmel |
| 7,412,147 B2 | 8/2008 | Scadden |
| 7,416,349 B2 | 8/2008 | Kramer |
| 7,493,002 B2 | 2/2009 | Coburn et al. |
| 7,565,052 B2 | 7/2009 | Swam et al. |
| 7,570,860 B2 | 8/2009 | Srnrha et al. |
| 7,620,287 B2 | 11/2009 | Appenzeller et al. |
| 7,623,749 B2 | 11/2009 | Reagan et al. |
| 7,816,602 B2 | 10/2010 | Landry et al. |
| 7,826,705 B2 | 11/2010 | McGranahan et al. |
| 7,856,166 B2 | 12/2010 | Biribuze et al. |
| 7,885,505 B2 | 2/2011 | Zimmel |
| 7,889,961 B2 | 2/2011 | Cote et al. |
| 8,179,684 B2 | 5/2012 | Smrha et al. |
| 8,249,410 B2 | 8/2012 | Andrus et al. |
| 8,301,003 B2 | 10/2012 | de los Santos Campos et al. |
| 8,315,498 B2 | 11/2012 | Redmann et al. |
| 8,428,418 B2 | 4/2013 | Smrha |
| 8,433,063 B2 | 4/2013 | Murano et al. |
| 8,457,464 B2 | 6/2013 | O'Connor |
| 8,472,776 B2 | 6/2013 | Ruiz |
| 8,506,805 B2 | 8/2013 | Kang et al. |
| 8,520,997 B2 | 8/2013 | Zimmel |
| 8,554,042 B2 | 10/2013 | Ruiz et al. |
| 8,820,860 B2 | 9/2014 | Ruiz et al. |
| 8,824,851 B2 | 9/2014 | Ruiz et al. |
| 8,679,882 B2 | 11/2014 | Conner et al. |
| 8,913,866 B2 | 12/2014 | Cote et al. |
| 8,965,168 B2 | 2/2015 | Cowen et al. |
| 9,014,527 B2 | 4/2015 | Mertesdorf |
| 9,052,489 B2 | 6/2015 | Ray et al. |
| 9,182,563 B2 | 11/2015 | Badar et al. |
| 9,285,558 B2 | 3/2016 | Gross et al. |
| 9,372,318 B2 | 6/2016 | Veatch et al. |
| 9,435,975 B2 | 9/2016 | Ott |
| 9,575,275 B2 | 2/2017 | Blackwell, Jr. et al. |
| 9,599,785 B2 | 3/2017 | Xu et al. |
| 9,625,668 B2 | 4/2017 | Xu et al. |
| 9,678,295 B2 | 6/2017 | Giraud et al. |
| 9,784,936 B2 | 10/2017 | Grandidge et al. |
| 9,810,869 B2 | 11/2017 | Campbell et al. |
| 9,817,201 B2 | 11/2017 | Lee et al. |
| 10,451,828 B1 * | 10/2019 | Ebrahimi ............ G02B 6/4447 |
| 2003/0223723 A1 | 12/2003 | Massey et al. |
| 2010/0220967 A1 | 9/2010 | Cooke et al. |
| 2010/0278499 A1 | 11/2010 | Mures et al. |
| 2012/0189261 A1 | 7/2012 | Denter et al. |
| 2016/0231525 A1 | 8/2016 | Murray et al. |
| 2017/0235070 A1 | 8/2017 | Zimmel et al. |

FOREIGN PATENT DOCUMENTS

| | | |
|---|---|---|
| EP | 2279442 81 | 6/2013 |
| EP | 2631692 A1 | 8/2013 |
| EP | 2631692 81 | 6/2014 |
| NL | 2005404 C | 3/2012 |
| WO | 2007133070 A1 | 11/2007 |
| WO | 2016168337 A1 | 10/2016 |
| WO | 2016170173 A1 | 10/2016 |

* cited by examiner

COMMUNICATIONS MODULE HOUSING

This application is a continuation of U.S. patent application Ser. No. 16/185,252, filed on Nov. 9, 2018, the disclosure of which is incorporated by reference herein in its entirety.

FIELD

The present disclosure related generally to communications module housings, and more particularly to communications module housings which include mounting apparatus for mounting multiple different types of communications modules.

BACKGROUND

Fiber optic management systems provide termination and service access points for fiber optic circuits. Where a large number of fiber optic cables are to be connected, connections are typically made in fiber distribution frames. The frames can be comprised of multiple equipment racks that form bays for containing fiber optic management components, such as splice boxes and communications modules such as cassettes, filters, etc. In many cases, housings are provided for accommodating such components.

Many known housings include defined mounting locations for accommodating specific types of communications modules have specific configurations and mounting features. In other words, a defined area within a communications module may be tailored to accommodate one specific type of communications module. Alternative module types may not be mountable in such defined area. This can be disadvantageous if multiple different types of communications modules may be necessary. Large housings having multiple different tailored areas may be required, or multiple different housings may be required.

Accordingly, improved communications module housings for accommodating communications modules are desired in the art. In particular, improved communications modules which can accommodate and mount therein multiple different types of communications modules in a relatively compact space would be advantageous.

BRIEF DESCRIPTION

Aspects and advantages of the invention will be set forth in part in the following description, or may be obvious from the description, or may be learned through practice of the invention.

In accordance with one embodiment, a communications module housing is provided. The housing accommodates first and second communications modules each including mounting features. The housing includes an enclosure defining an opening, and a tray movably positioned within the enclosure. The tray includes a base, and a front rail positioned on the base, the front rail including a plurality of first mounts. The tray further includes a platform positioned on the base, the platform including a plurality of second mounts. The tray further includes a rear rail positioned on the base, the rear rail including a plurality of third mounts. The tray further includes a cable tie-off bracket positioned on the base, the cable tie-off bracket rotatable relative to the base between a first stored position and a second extended position.

In accordance with one embodiment, a communications module housing is provided. The housing accommodates first and second communications modules each including mounting features. The communications module housing defines a vertical axis, a lateral axis, and a transverse axis. The housing includes an enclosure defining an opening. The enclosure includes a top wall and a bottom wall spaced apart along the vertical axis, a first sidewall and a second sidewall spaced apart along the lateral axis, and a rear wall spaced apart from the opening along the transverse axis. The housing further includes a tray positioned within the enclosure and movable along the transverse axis. The tray includes a base, the base including a first panel and a second panel, the second panel rotatable relative to the first panel. The tray further includes a front rail positioned on the base, the front rail including a plurality of first mounts. The tray further includes a platform positioned on the base, the platform including a plurality of second mounts. The tray further includes a rear rail positioned on the base, the rear rail including a plurality of third mounts. The tray further includes a cable tie-off bracket positioned on the base, the cable tie-off bracket rotatable relative to the base between a first stored position and a second extended position.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION

A full and enabling disclosure of the present invention, including the best mode thereof, directed to one of ordinary skill in the art, is set forth in the specification, which makes reference to the appended figures, in which.

DETAILED DESCRIPTION

Figure 1:
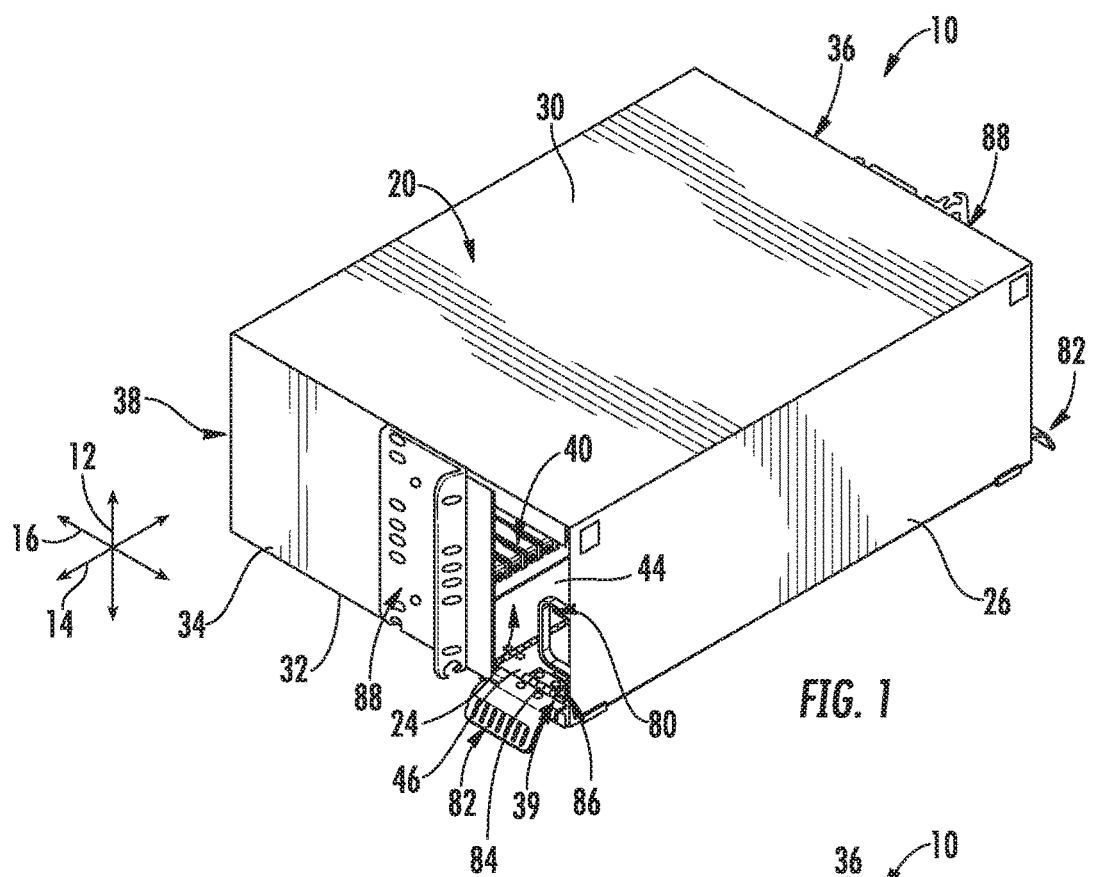
FIG. 1 is a front perspective view of a communications module housing, with cable-tie off brackets in second extended positions, in accordance with embodiments of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Referring now to FIGS. 1 through 9, the present disclosure is generally directed to communications modules housings 10. A housing 10 in accordance with the present disclosure advantageously includes improved features for accommodating various different designs of communications modules 100 having different mounting features. In exemplary embodiments, this allows multiple different types of communications modules 100 to be selectively positioned in the same location within the housing 10. Selection and use of such various communications modules 100 in any suitable combination is thus advantageously accommodated by such housings 10.

Further, such housings 10 may additionally include other advantageous features such as cable organization features communications module access features, as discussed herein.

As shown, a vertical axis 12, lateral axis 14, and transverse axis 16 may be defined for housings 10 in accordance with the present disclosure. The axes 12, 14, 16 may be mutually orthogonal, thus defining a coordinate system for the housing 10.

Figure 9:
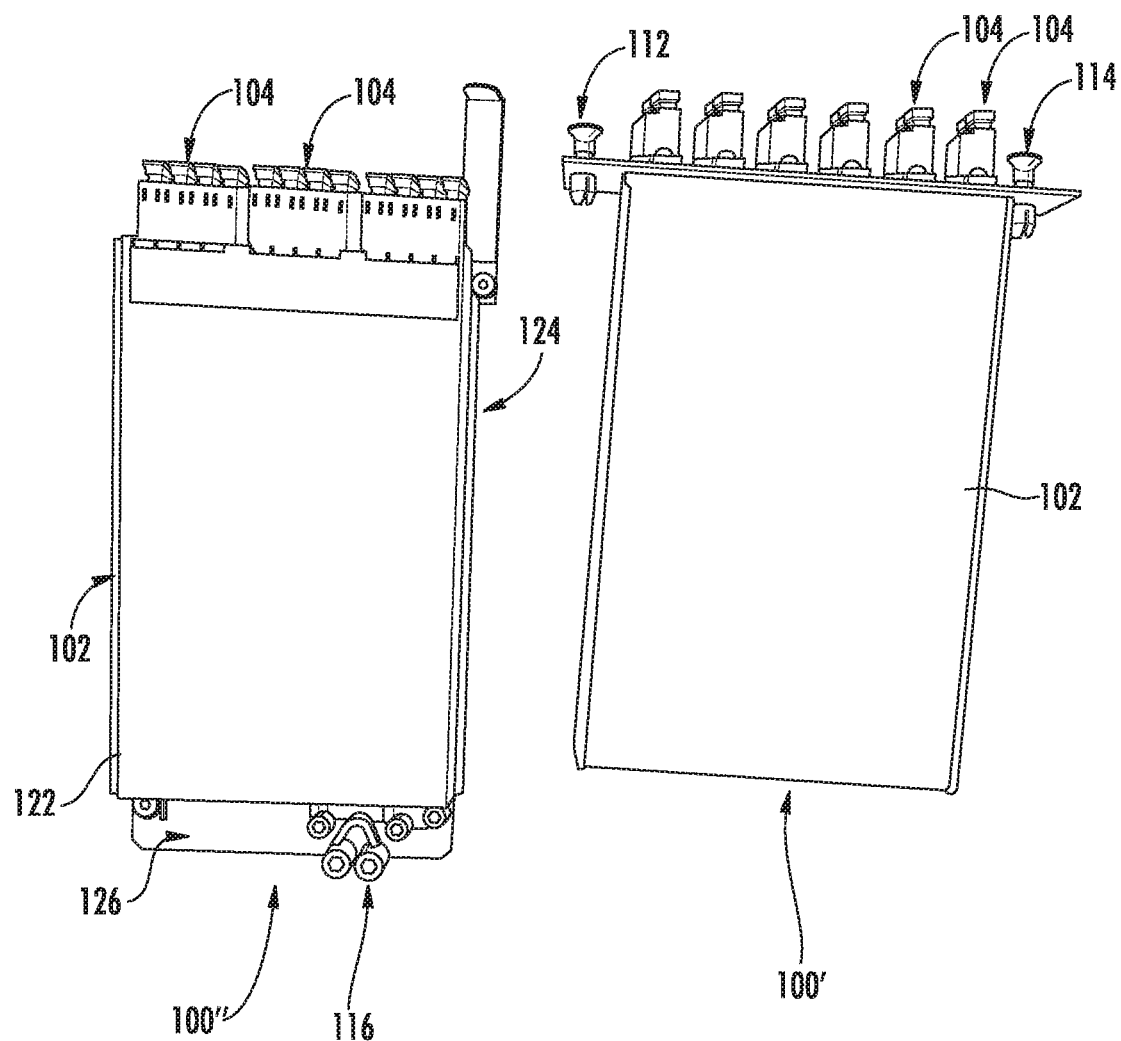
FIG. 9 is a side view of various communications modules for use with a communications module housing in accordance with embodiments of the present disclosure.

FIG. 9 illustrates embodiments of communications modules 100. In some embodiments, a communications module 100 may be a cassette. In other embodiments, as shown, a communications module 100 may be a filter. Two different types of communications modules 100 are illustrated in FIG. 9. A communications module 100 may include a body 102 and a plurality of adapters 104, each adapter configured to accommodate a connector (such as of an optical fiber cable). The adapters 104 may in some embodiments, for example, all be positioned at a front of the body 102. A communications module 100 may further include one or more mounting features.

A first communications module 100', for example, may include a first mounting feature 112 and a second mounting feature 114 each extending from the body 102. In some embodiments, the first mounting feature 112 may be spaced apart along the vertical axis 12 from the second mounting feature 114 when the communications module 100 is oriented with respect to the housing 10. In some embodiments, as shown, the mounting features 112, 114 may be male fasteners which mate with female holes as discussed herein. In other embodiments, other suitable mounting apparatus may be utilized.

A second communications module 100" may, for example, include a third mounting feature 116 extending from the body 102. In some embodiments, as shown, the third mounting feature 116 may be a clip which mates with a tab as discussed herein. In other embodiments, other suitable mounting apparatus may be utilized.

The first or second communications module 100', 100" may further include various components for guiding and locating the communications module 100 within the housing 100. For example, the first or second communications module 100', 100" may include one or more rails extending therefrom, such as a first rail 122, a second rail 124, and/or a third rail 126. In some embodiments, the rails 122, 124, 126 may be components of a singular plate which is mounted to the body 102, while in other embodiments, the rails 122, 124, 126 may be separate components. The rails 122, 124, 126 may engage with mating slots as discussed herein.

Referring now to FIGS. 1 through 8, a housing 10 may include an enclosure 20 which may define one or more openings 22 and an interior 24. The enclosure 20 may include various outer walls which define the openings 22 and interior 24.

Figure 2:
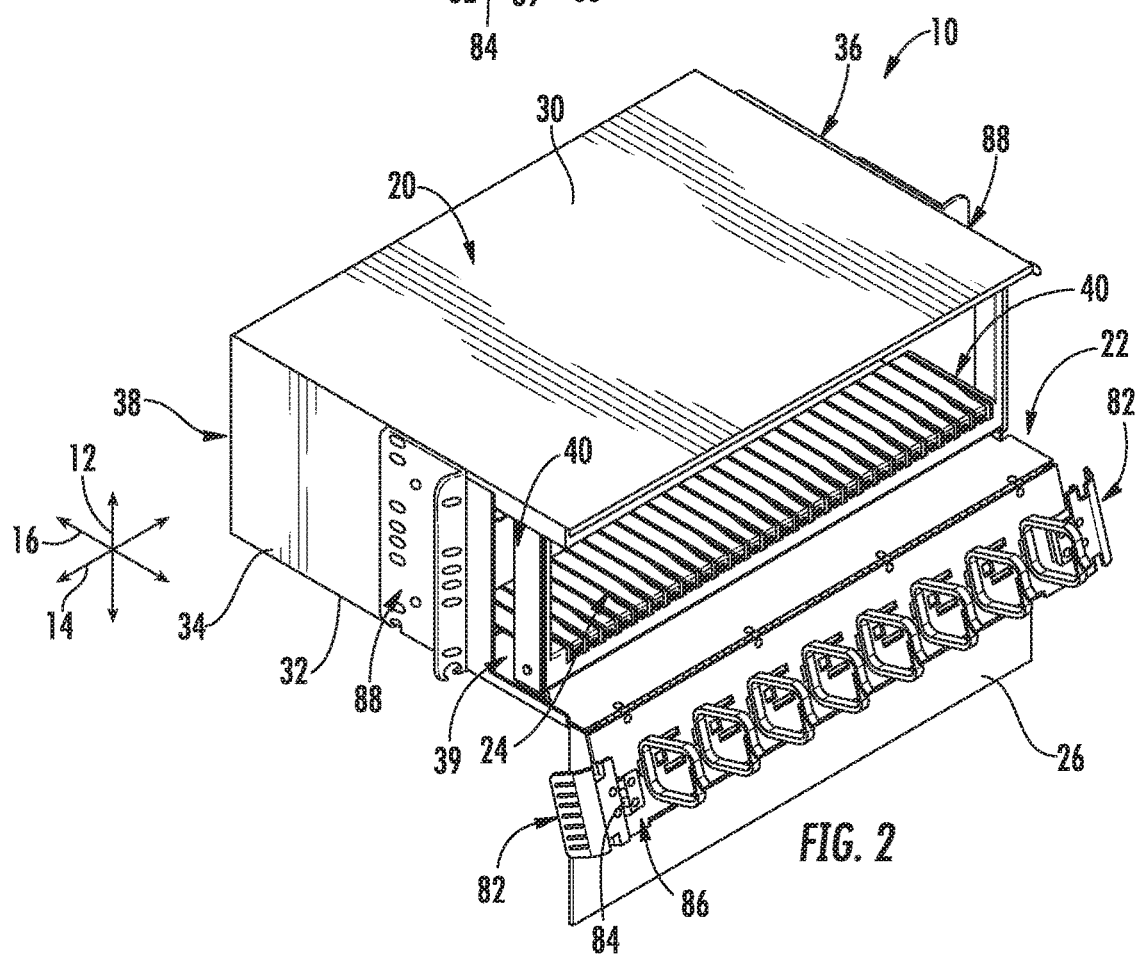
FIG. 2 is a front perspective view of the communications module housing of FIG. 2 with a housing door opened and a tray moved into a position partially exterior to the housing.
Figure 3:
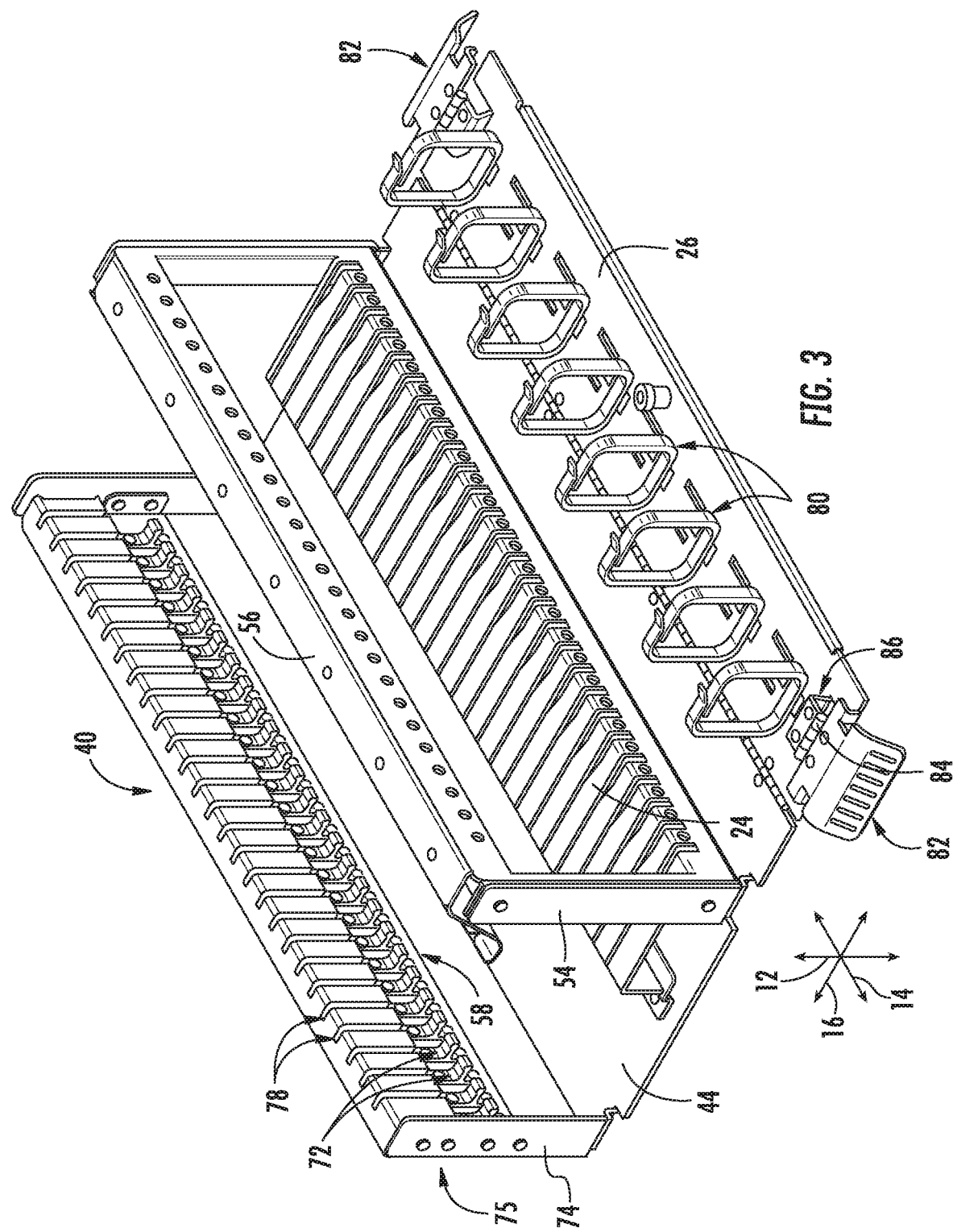
FIG. 3 is a front perspective view of a tray for a communications module housing in accordance with embodiments of the present disclosure.
Figure 4:
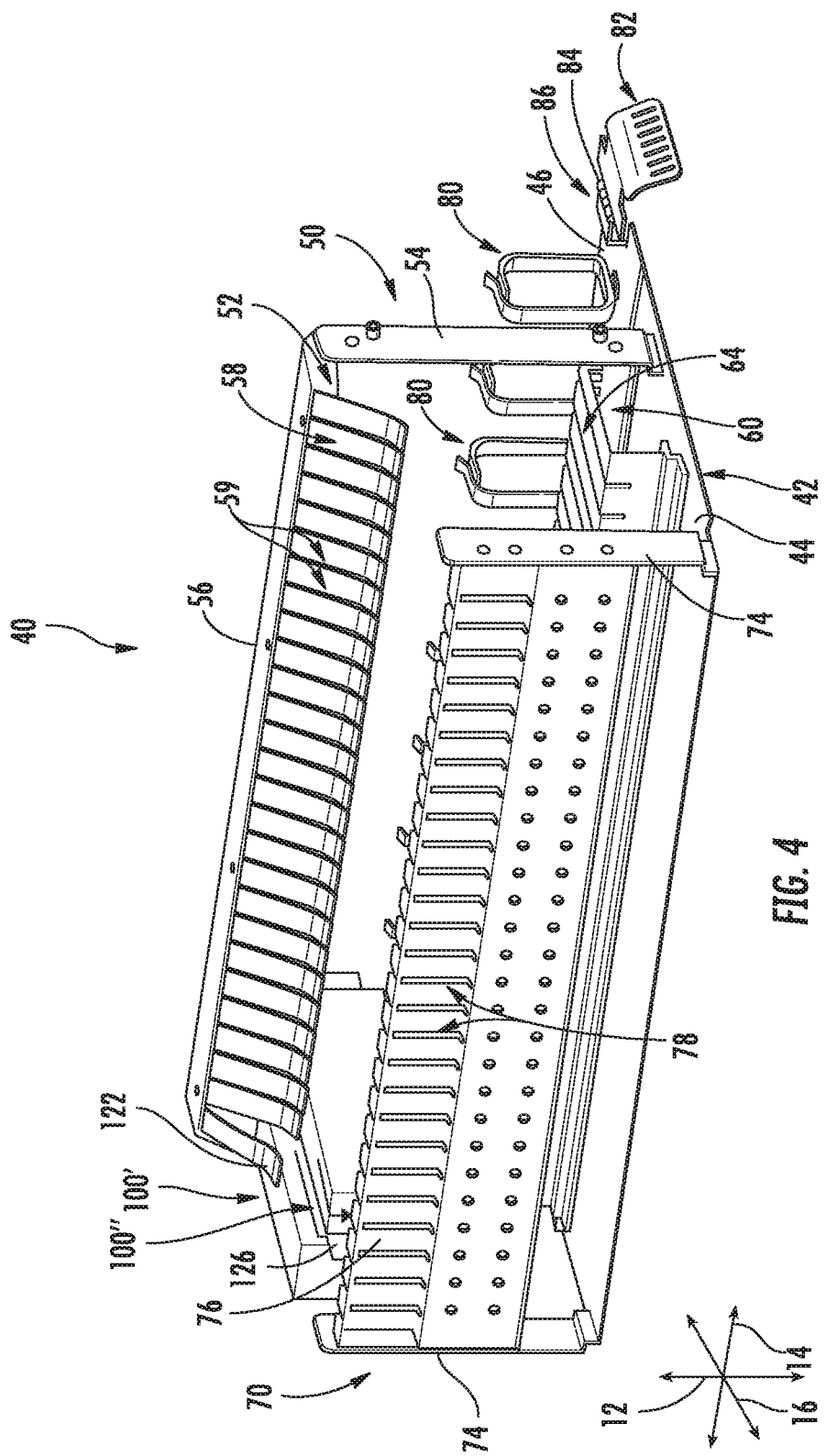
FIG. 4 is a side perspective view of a tray for a communications module housing in accordance with embodiments of the present disclosure.
Figure 5:
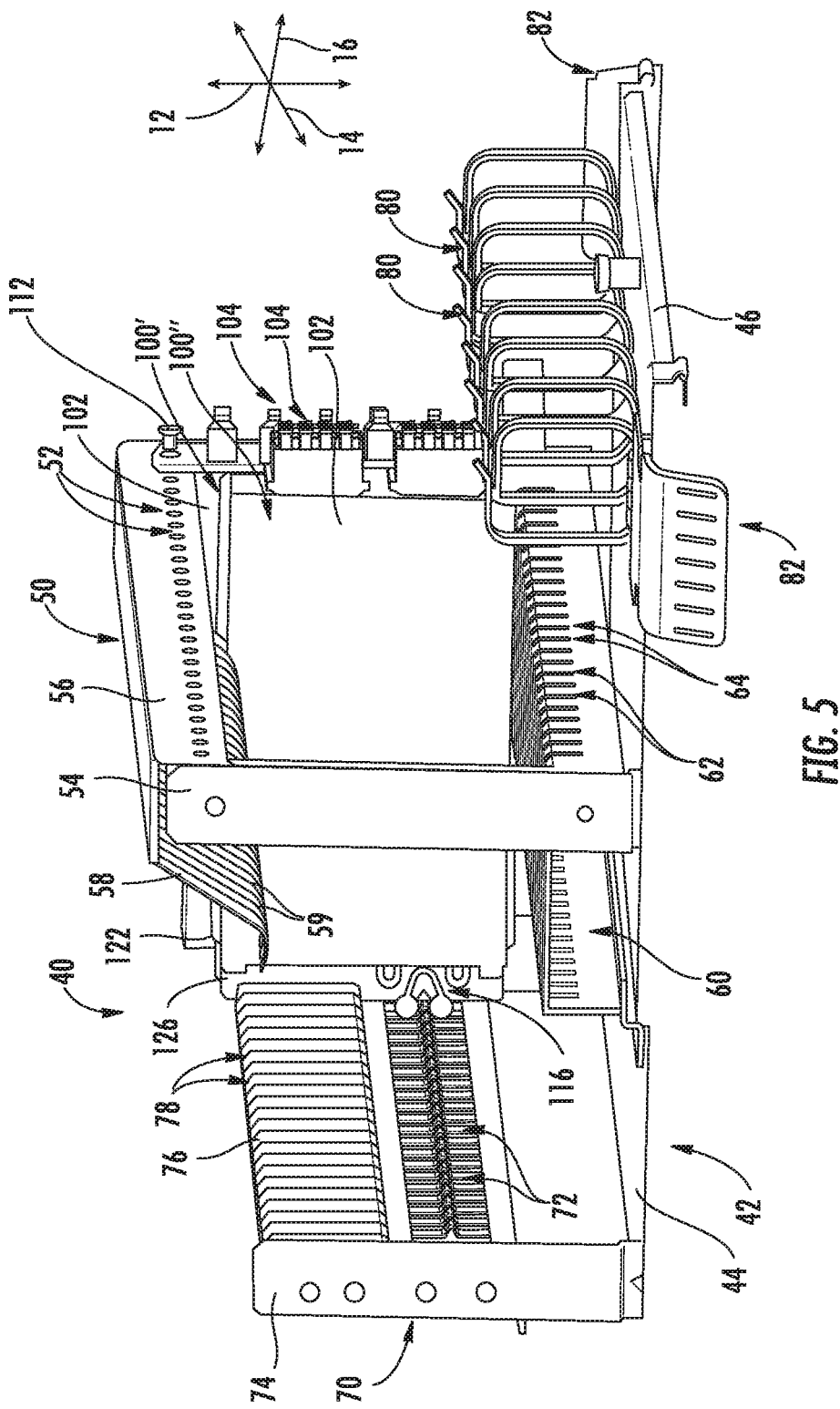
FIG. 5 is a rear perspective view of a tray for a communications module housing in accordance with embodiments of the present disclosure.
Figure 6:
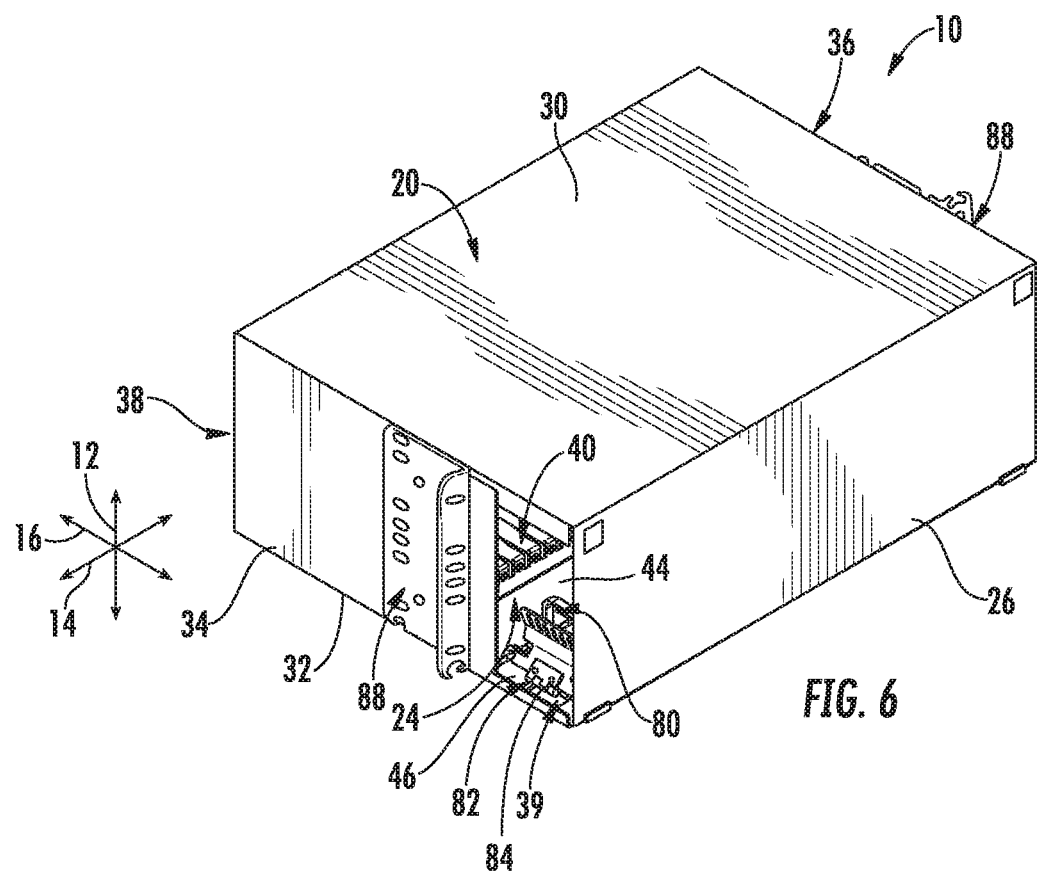
FIG. 6 is a front perspective view of a communications module housing, with cable-tie off brackets in first stored positions, in accordance with embodiments of the present disclosure.
Figure 7:
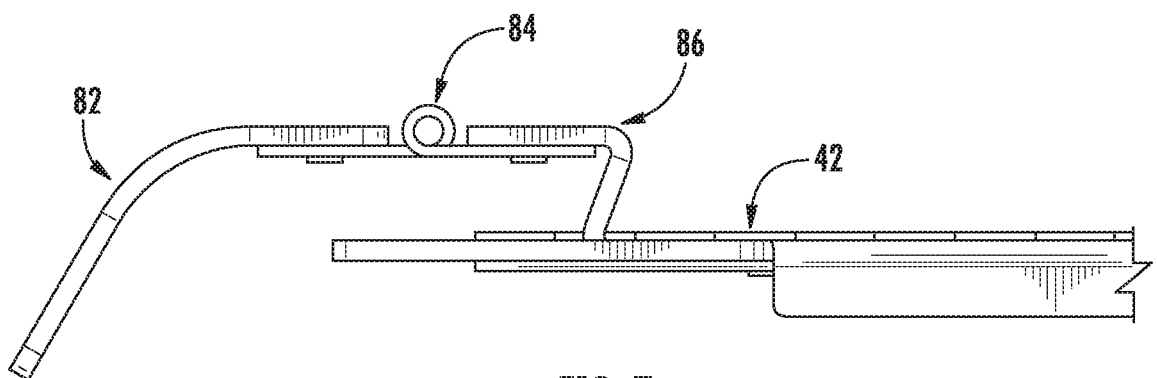
FIG. 7 is a cross-sectional view of a cable tie-off bracket positioned on a tray base in accordance with embodiments of the present disclosure.
Figure 8:
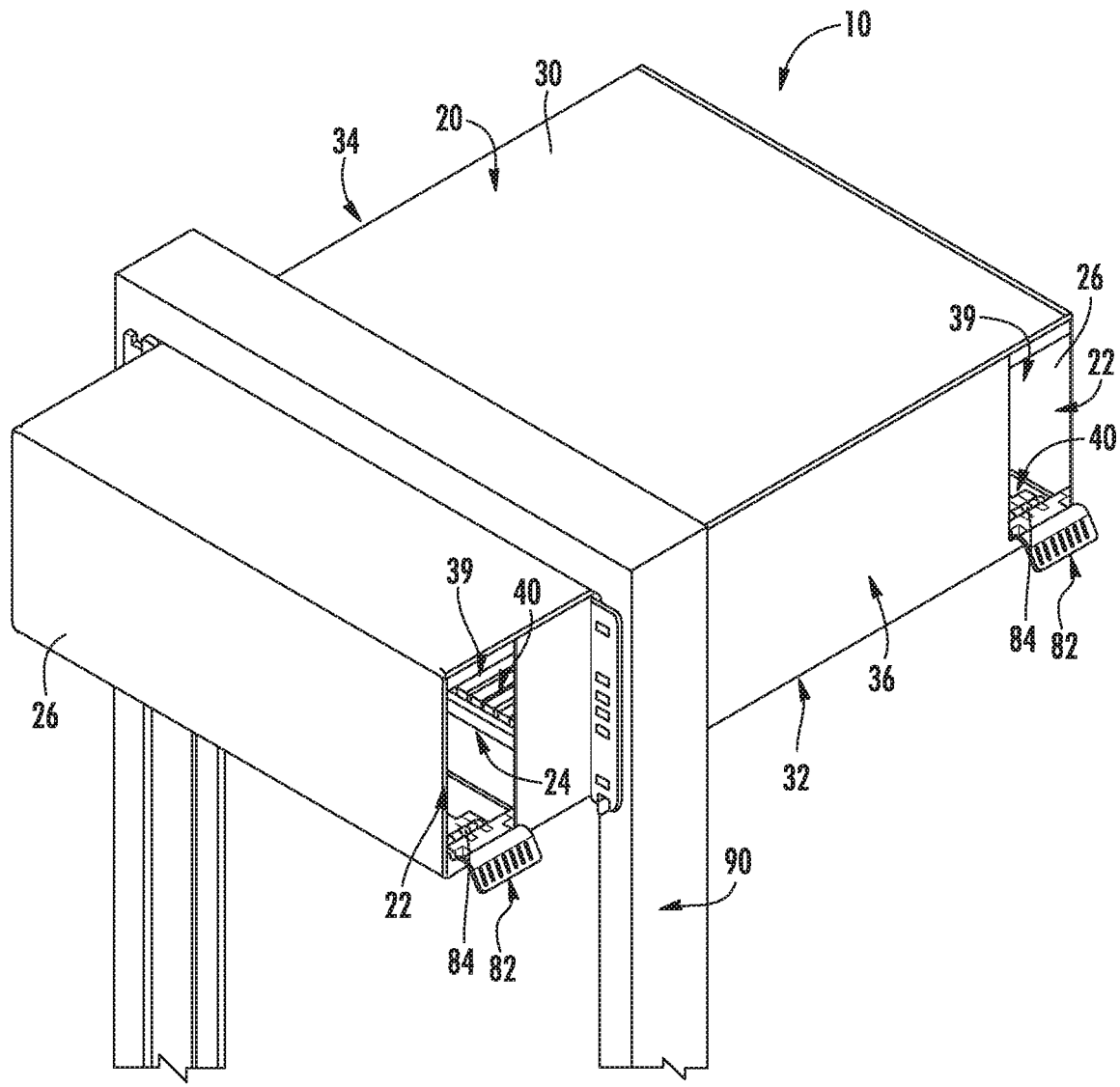
FIG. 8 is a perspective view of a communications module housing mounted to an equipment rack in accordance with embodiments of the present disclosure.

For example, the enclosure 20 may in some embodiments include a top wall 30 and a bottom wall 32 which are spaced apart from each other along the vertical axis 12. The enclosure 20 may in some embodiments further include a first sidewall 34 and a second sidewall 36 which are spaced apart from each other along the lateral axis 14. As illustrated in FIGS. 1, 2, and 6, the enclosure 20 may in some embodiments further include a rear wall 38 which is spaced apart from an opening 22 along the transverse axis 16. Alternatively, as illustrated in FIG. 8, the enclosure 20 may include multiple openings 22, including a first front opening 22 and a second rear opening which is spaced apart from the first front opening 22 along the transverse axis 16.

In other embodiments, one or more of the above-identified walls need not be included. Further, it should be appreciated that the enclosure 20 may have any suitable cubic or non-cubic shape.

Enclosure 20 may further include one or more doors 26, each of which provides selective access through an associated opening 22 to the interior 24. Each door 26 may be movably connected to a wall of the enclosure 20, such as to bottom wall 32 as shown. In some embodiments, door 26 is rotatable relative to such wall, such as along the lateral axis 14. Door 26 may be movable between a first closed position (FIGS. 1, 6, and 8) in which access to the interior 24 through opening 22 is impeded and a second open position (FIG. 2) in which access to the interior 24 through opening 22 is allowed.

In some embodiments, one or more of the walls may include cutouts 39 defined therein. For example, as shown, a cutout 39 may be defined in one or both sidewalls 34, 36, such as adjacent the opening 22. Such cutouts 39 may, for example, accommodate optical fiber cables extending into the enclosure when, for example, the door 26 is in a closed position.

As further illustrated, housing 10 includes one or more trays 40, each of which is positionable within the enclosure 20, such as in the interior 24 thereof. The tray 40 may further be movable relative to the enclosure 20. For example, in some embodiments, the tray 40 may be movable between a first position (FIG. 1) in which the tray 40 is entirely within the enclosure 20 (such as the interior 24 thereof) and a second position (FIG. 2) in which at least a portion of the tray 40 is exterior to the enclosure 20. In exemplary embodiments, tray 40 is movable along the transverse axis 16, as shown.

FIGS. 1, 2, and 6 illustrate embodiments wherein only a single tray 40 is utilized. The tray 40 may, for example, be accessible through a single opening 22 which is spaced from a rear wall 38, as shown. Alternatively, FIG. 8 illustrates an embodiment wherein multiple (in this case, two) trays 40 are utilized. Each tray 40 may, for example, be accessible through a different opening 22, such as the first and second openings 22 as shown. In the embodiment shown, the trays 40 are movable in opposite directions relative to each other between their respective first and second positions, such as along the transverse axis.

Tray 40 may, for example, include a base 42. Various other components of the tray 40, such as mounting features which mate with mounting features of communications modules 100 as discussed herein, may be positioned on the base 42.

In some embodiments, base 42 may be a single panel. In other embodiments, base 42 may include a first panel 44 and a second panel 46. In these embodiments, the second panel 46 may, for example, be rotatable relative to the first panel 44. For example, the second panel 46 may be rotatable relative to the first panel 44 about the lateral axis 14. Further, as discussed, in some embodiments, the tray 40 may be movable between a first position and a second position. In some embodiments, in the first position, the second panel 46 (and first panel 44) may be entirely within the enclosure (such as the interior 24 thereof) and in the second position, the second panel 46 may be at least partially exterior to the enclosure 20. For example, in some embodiments, in the second position, the second panel 46 may be entirely exterior to the enclosure 20. Further, for example, in the second position, the second panel 46 may rotate relative to the first panel 44 to a position that is non-planer with the first panel 44. Such movement may advantageously facilitate improved access to other components of the tray 40 and to the interior 24 of the enclosure 20. When the tray 40 is moved back to the first position, the second panel 46 may rotate back to a position that is panel with the first panel 44.

The tray 40 may further include other components which have mounting features which mate with mounting features of communications modules 100 as discussed herein. For example, a tray 40 may include a front rail 50. Front rail 50 may be positioned on the base 42, such as in some embodiments on the first panel 44 thereof. The front rail 50 may include a plurality of first mounts 52. Each first mount 52 may mate with a first mounting feature 112 of a communications module 100, such as a first communications module 100'. In exemplary embodiments, each first mount 52 may be a hole defined in the front rail 50. Each such hole may interact with a male fastener as discussed. Alternatively, other suitable mounts may be utilized. In exemplary embodiments, the first mounts 52 are aligned in a linear array, such as along the lateral axis 14.

Front rail 50 may include legs 54 and a rail body 56 which extends between the legs 54. For example, legs 54 may be spaced apart along the lateral axis 14, and rail body 56 may extend along the lateral axis 14 therebetween. The first mounts 52 may, for example, be provided on the rail body 56.

Front rail 50 may additionally include a panel 58 which may for example extend from the rail body 56. For example, panel 58 may be a cantilevered panel which extends from the rail body 56, such as along the transverse axis 16. Further, in exemplary embodiments, the panel 58 may have a curvilinear cross-sectional profile. Such panel 58 may advantageously contact communications modules 100 inserted through the front rail 50 to stabilize the communications modules 100 on the tray 40 and in the enclosure 20 generally.

Front rail 50 may further include a plurality of slots 59 defined therein. In some embodiments, the slots 59 are defined in the panel 58. Further, in some embodiments, the slots 59 may be aligned in a linear array. Each slot 59 may be engage with a first rail 122 of a communications module 100, such as a second communications module 100", to locate and stabilize the communications module 100. Accordingly, when such communications module 100 is inserted in the tray 40, the first rail 122 may be inserted into a slot 59.

Tray 40 may further include a platform 60. Platform 60 may be positioned on the base 42, such as in some embodiments on the first panel 44 thereof. The platform 60 may include a plurality of second mounts 62. Each second mount 62 may mate with a second mounting feature 114 of a communications module 100, such as a first communications module 100'. In exemplary embodiments, each second mount 62 may be a hole defined in the platform 60. Each such hole may interact with a male fastener as discussed. Alternatively, other suitable mounts may be utilized. In exemplary embodiments, the second mounts 62 are aligned in a linear array, such as along the lateral axis 14.

Platform 60 may further include a plurality of slots 64 defined therein. In some embodiments, the slots 64 may be aligned in a linear array. Each slot 64 may be engage with a second rail 124 of a communications module 100, such as a second communications module 100", to locate and stabilize the communications module 100. Accordingly, when such communications module 100 is inserted in the tray 40, the second rail 124 may be inserted into a slot 64.

Tray 40 may include a rear rail 70. Rear rail 70 may be positioned on the base 42, such as in some embodiments on the first panel 44 thereof. The rear rail 70 may include a plurality of third mounts 72. Each third mount 72 may mate with a third mounting feature 116 of a communications module 100, such as a second communications module 100". In exemplary embodiments, each third mount 72 may be a tab extending from the rear rail 70. Each such tab may interact with a clip as discussed. In exemplary embodiments, such tabs may be formed from tempered spring steel, although in other embodiments other suitable materials may be utilized. Alternatively, other suitable mounts may be utilized. In exemplary embodiments, the third mounts 72 are aligned in a linear array, such as along the lateral axis 14.

Rear rail 70 may include legs 74 and a rail body 76 which extends between the legs 76. For example, legs 74 may be spaced apart along the lateral axis 14, and rail body 76 may extend along the lateral axis 14 therebetween. The third mounts 72 may, for example, be provided on the rail body 76.

Rear rail 70 may further include a plurality of slots 78 defined therein. In some embodiments, the slots 78 are defined in the rail body 76. Further, in some embodiments, the slots 78 may be aligned in a linear array. Each slot 78 may be engage with a third rail 126 of a communications module 100, such as a second communications module 100", to locate and stabilize the communications module 100. Accordingly, when such communications module 100 is inserted in the tray 40, the third rail 126 may be inserted into a slot 78.

In exemplary embodiments, the rear rail 70 may be offset along the transverse axis 16 from the front rail 50 and the platform 60. Further, in exemplary embodiments, the front rail 50 and the platform 60 (such as front faces thereof on which the first and second mounts 52, 62 are provided) are aligned along the transverse axis 16.

In exemplary embodiments, each position on the tray 40 at which a communications module 100 may be inserted and secured may include a first mount 52, a second mount 62, and a third mount 72, and may further include one or more of a first slot 59, second slot 64, and/or third slot 78. Accordingly, each such position may selectively accommodate a variety of different configurations of communications modules 100, such as first and second communications modules 100', 100" as discussed herein.

Housing 10 may further include additional components for routing, organizing, and securing optical fiber cables thereto. For example, a plurality of routing rings 80 may be provided. The routing rings 80 may be provided on the tray 40, such as on the base 42 thereof. In exemplary embodiments, the routing rings 80 may be provided on the second panel 46 of the base 42. In some embodiments, the routing rings 80 may be arranged in a linear array, such as along the lateral axis 14. Optical fiber cables may be routed through the routing rings 80 as they enter the housing 10.

Additionally or alternatively, one or more cable tie-off brackets 82 may be provided. The cable tie-off brackets 82 may be provided on the tray 40, such as on the base 42 thereof. In exemplary embodiments, the cable tie-off brackets 82 may be provided on the second panel 46 of the base 42. Optical fiber cables may be secured at the cable tie-off brackets 82 as they enter the housing 10. The brackets 82 may also advantageously serve as strain-relief components.

In exemplary embodiments as shown, one or more of the cable tie-off brackets 82 may be rotatable relative to the base 42 between a first stored position (see FIG. 6) and a second extending position (see FIGS. 1 through 5, 7, and 8). Such rotation may, for example, occur about the transverse axis 16. For example, in embodiments wherein the brackets 82 are provided on the second panel 46, the rotation may in some embodiments occur about the transverse axis 16 when the second panel 46 is planer with the first panel 44. When the second panel 46 moves to a position that is non-planer with the first panel 44, such rotation may occur about another axis, such as in some cases the vertical axis 12.

In exemplary embodiments, a cable tie-off bracket 82 in the first position may be entirely within the interior 24 (when the tray 40 is in the first position). Further, in exemplary embodiments, a cable tie-off bracket 82 in the second position may be at least partially exterior to the enclosure 20. For example, a bracket 82 may extend through a cutout 39 when in the second position (and when the tray 40 is in the first position).

To facilitate such rotation, the cable tie-off bracket 82 may be rotatably connected to the base 42 (such as in some embodiments the second panel 46), such as via a hinge 84. The hinge 84 may be directly connected to the bracket 82, and may further be directly or indirectly connected to the base 42 (such as in some embodiments the second panel 46). For example, in some embodiments, a portion 86 of the base 42 (such as of the second panel 46) may be bent so as to be raised (such as along the vertical axis 12 when the tray 40 is in the first position) relative to the remainder of the base 42 (such as the second panel 46). The hinge 84 may be directly connected to this portion 86. Alternatively, a separate bracket may be connected to the base 42 (such as to the second panel 46) to form such raised component, and the hinge 84 may be directly connected to such separate bracket.

Housing 10 may further include one or more mounting brackets 88. The mounting brackets 88 may be provided on the enclosure 20 and exterior to the enclosure, such as on the first and second sidewall 34, 36. Mounting brackets 84 may facilitate mounting of the housing 10 to suitable equipment racks 90, etc.

The rotatable brackets 82 may advantageously facilitate easy and efficient mounting of housings 10 in equipment racks 90, as shown for example in FIG. 8. For example, the brackets 82 can advantageously be rotated to the first position during installation, allowing increased clearance for the housing 10 within a rack 90 during installation into the rack 90. Installation is thus advantageously simplified. Once the housing 10 is installed in the rack 90, the brackets 82 can be rotated to their second extended positions for use in tying down cables.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A communications module housing defining a vertical axis, a lateral axis, and a transverse axis, the communications module housing comprising:
    an enclosure defining an opening, the enclosure comprising a top wall and a bottom wall spaced apart along the vertical axis, a first sidewall and a second sidewall spaced apart along the lateral axis, and a rear wall spaced apart from the opening along the transverse axis;
    a tray positioned within the enclosure and movable along the transverse axis, the tray comprising:
        a base;
        a plurality of first mounts positioned on the base;
        a plurality of second mounts positioned on the base and offset along the vertical axis from the plurality of first mounts;
        a plurality of third mounts positioned on the base and offset along the transverse axis from the plurality of first mounts and the plurality of second mounts; and
        a cable tie-off bracket positioned on the base, the cable tie-off bracket rotatable relative to the base between a first stored position and a second extended position.

2. The communications module housing of claim 1, wherein the tray further comprises a front rail positioned on the base, the front rail comprising the plurality of first mounts.

3. The communications module housing of claim 1, wherein the tray further comprises a platform positioned on the base, the platform comprising the plurality of second mounts.

4. The communications module housing of claim 1, wherein the tray further comprises a rear rail positioned on the base, the rear rail comprising the plurality of third Mounts.

5. The communications module housing of claim 1, wherein the first and second mounts are holes.

6. The communications module housing of claim 1, wherein the third mounts are tabs.

7. The communications module housing of claim 2, further comprising a plurality of slots defined in the front rail.

8. The communications module housing of claim 7, wherein the slots are defined in a cantilevered panel of the front rail.

9. The communications module housing of claim 3, further comprising a plurality of slots defined in the platform.

10. The communications module housing of claim 4, further comprising a plurality of slots defined in the rear rail.

11. The communications module housing of claim 1, wherein the base comprising a first panel and a second panel, the second panel rotatable relative to the first panel.

12. The communications module housing of claim 11, wherein the tray is movable between a first position wherein the second panel is entirely within the enclosure and a second position wherein the second panel is at least partially exterior to the enclosure.

13. The communications module housing of claim 11, wherein the plurality of first mounts, the plurality of second mounts, and the plurality of third mounts are positioned on the first panel.

14. The communications module housing of claim 11, further comprising a plurality of routing rings positioned on the second panel.

15. The communications module housing of claim 11, wherein the cable tie-off bracket is positioned on the second panel.

\* \* \* \* \*